United States Patent [19]
Tsuzuki et al.

[11] Patent Number: 5,903,061
[45] Date of Patent: May 11, 1999

[54] CONTROL SYSTEM FOR VEHICULAR DRIVE UNIT

[75] Inventors: Shigeo Tsuzuki, Takahama; Satoru Tanaka, Nishio; Takeshi Hara, Chiryu; Manabu Watanabe, Toyota; Kenji Omote, Nishio, all of Japan

[73] Assignee: Aisin AW Co., Ltd., Anjo, Japan

[21] Appl. No.: 08/695,773

[22] Filed: Aug. 8, 1996

[30] Foreign Application Priority Data

Aug. 15, 1995 [JP] Japan ..................................... 7-208235

[51] Int. Cl.⁶ ....................................................... F02N 11/06
[52] U.S. Cl. ................... 290/40 C; 290/40 A; 290/40 B; 290/40 R; 477/3; 477/16; 477/20
[58] Field of Search .................................. 180/65.2, 65.4, 180/65.6, 2.1, 53.8, 165; 290/404, 45; 477/3, 5

[56] References Cited

U.S. PATENT DOCUMENTS

| | | | |
|---|---|---|---|
| 4,951,769 | 8/1990 | Kawamura | 180/65.4 |
| 5,258,651 | 11/1993 | Sherman | 290/4 |
| 5,285,111 | 2/1994 | Sherman | 290/4 |
| 5,406,797 | 4/1995 | Kawamura | 60/608 |
| 5,478,293 | 12/1995 | Yonezawa | 477/110 |
| 5,489,001 | 2/1996 | Yang | 180/65.2 |
| 5,495,912 | 3/1996 | Gray, Jr. et al. | 180/165 |
| 5,558,173 | 9/1996 | Sherman | 180/53.8 |
| 5,582,262 | 12/1996 | Wust | 180/2.1 |
| 5,584,174 | 12/1996 | Bates et al. | 60/39.161 |
| 5,643,119 | 7/1997 | Yamaguchi et al. | 475/5 |
| 5,667,029 | 9/1997 | Urban et al. | 180/65.2 |
| 5,704,440 | 1/1998 | Urban et al. | 180/65.2 |

*Primary Examiner*—Elvin G. Enad
*Attorney, Agent, or Firm*—Oliff & Berridge, PLC

[57] ABSTRACT

A control system for a vehicular drive unit having an engine, a motor-generator for acting as a motor and a generator, a planetary gear including at least three rotary elements, a battery for storing electric power as generated by the motor-generator and for feeding electric power to drive the motor-generator, an engine controller for causing the engine to output a target output value on a best mileage curve; and a motor-generator controller for controlling the motor-generator. When the output of the motor-generator corresponding to a target output value of the engine is within an outputtable region of the motor-generator, the motor-generator controller causes the motor-generator to output a reaction torque corresponding to the output torque of the engine. When the output of the motor-generator is outside of the outputtable region, the motor-generator controller changes the target output value of the engine so that the output of the motor-generator is within the outputtable region, to thereby change the output of the motor-generator in accordance with the changed target output value of said engine.

7 Claims, 13 Drawing Sheets

POWER TRAIN A

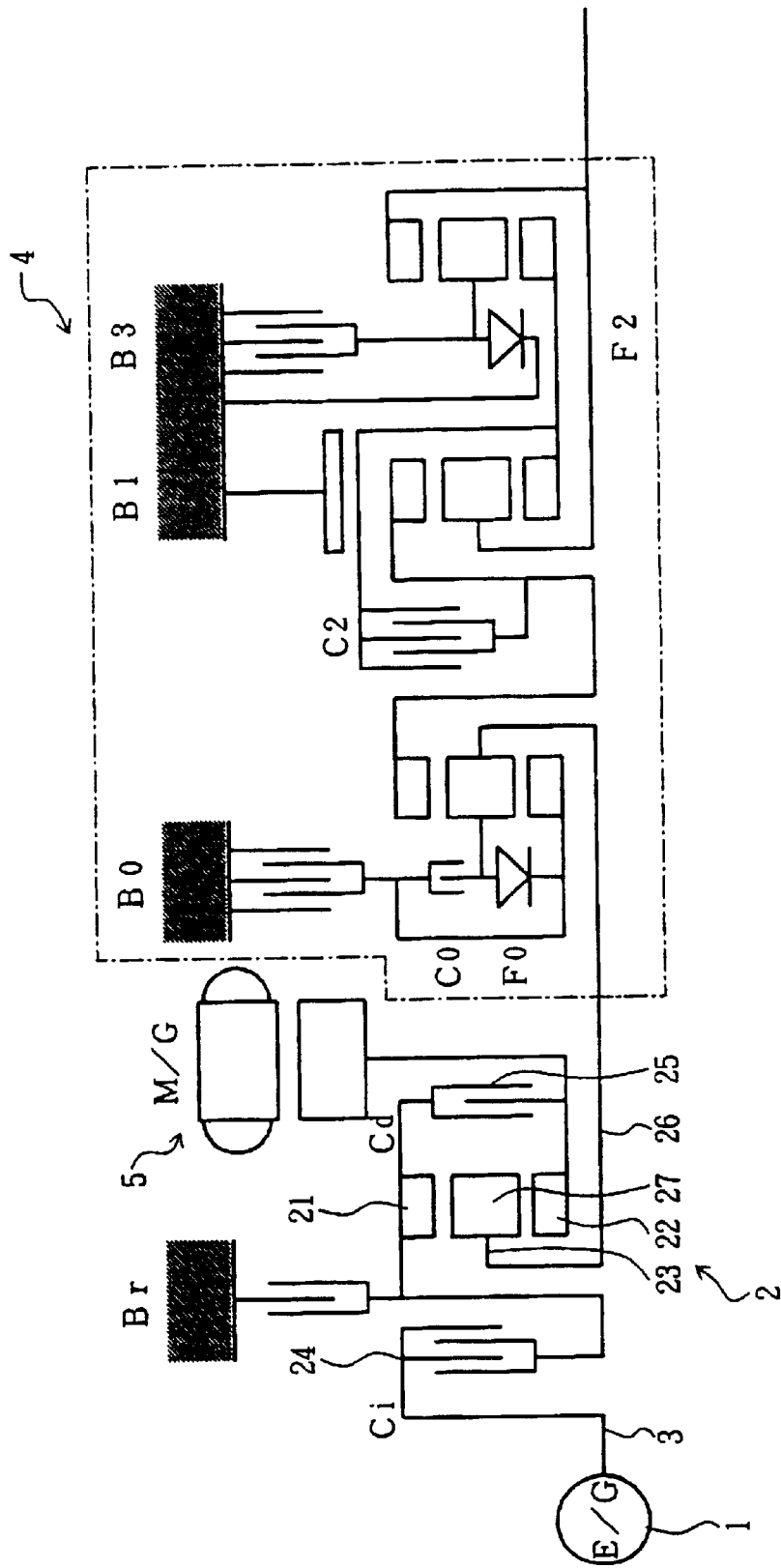

CONTROL SYSTEM FOR VEHICULAR DRIVE UNIT

BACKGROUND OF THE INVENTION

1. Field of the Invention

The invention relates to a control system for a vehicular drive unit, and more particularly, to a control system for a vehicular drive unit including an engine and a motor-generator.

2. Related Art

As a technique of this field, there has been a vehicular drive unit which is structured to include a power transmission between an engine and a speed change mechanism and a motor-generator connected to the power transmission as disclosed in U.S. Pat. No. 5,285,111. When the vehicle is to be started by the drive unit, the power transmission is brought into a split state, and the motor-generator is caused to output a reaction against the output torque of the engine and to act as a generator so that the RPM of the output shaft is gradually raised to start the vehicle.

In the prior art described above, however, the motor-generator has to output an RPM according to the reaction torque of the engine and the vehicle speed. At a quick start, when the accelerator pedal is fully depressed from a stopped, or halted, state, for example, the output torque of the engine rises so highly that the motor-generator may fail to output the reaction torque. In this case, the engine output cannot be borne by the motor-generator, and the engine may possibly race.

In order to prevent this, one conceivable solution is to enlarge the motor-generator or, alternatively, to provide a throttle control mechanism (e.g., a sub-throttle mechanism) for controlling the accelerator opening of the engine. In either case, however, the drive unit is enlarged and complicated in structure which raises the cost.

SUMMARY OF THE INVENTION

It is, therefore, an object of the invention to provide a control system for a vehicular drive unit including an engine, a motor-generator and a planetary gear, which provides improved mileage and reduces and simplifies the structure of the drive unit thereby reducing costs by running the engine more efficiently.

In order to achieve the above-specified object, according to the invention, there is provided a control system for a vehicular drive unit comprising an engine; a motor-generator for acting as a motor and a generator; a planetary gear including at least three rotary elements, the first rotary element connected to the output shaft of the engine, the second rotary element acting a reaction against the first rotary element and connected to the motor-generator, and the third rotary element connected to an output member for transmitting drive power to the wheels; a battery for storing electric power as generated by the motor-generator, and for feeding electric power to drive the motor-generator; engine control means for causing the engine to output a target output value on a best mileage curve; and motor-generator control means for controlling the motor-generator, wherein the motor-generator control means causes the motor-generator, when the output value of the motor-generator corresponding to the target output value of the engine is within an outputtable region of the motor-generator, to output a reaction torque corresponding to the output torque of the engine, and changes the target output value of the engine, when the output value of the motor-generator is outside of the outputtable region of the motor-generator, so that the output value of the motor-generator may be within the outputtable region of the motor-generator, to thereby change the output of the motor-generator in accordance with the changed target output value.

In a control system for a vehicular drive unit, the motor-generator control means changes the target output value of the engine, when the output value of the motor-generator is outside of the outputtable range of the motor-generator, so that the output value of the motor-generator may lie on a maximum outputtable curve of the motor-generator, to thereby change the output of the motor-generator in accordance with the changed target output value.

In a control system for a vehicular drive unit, there is further provided an automatic transmission connected to the output member for establishing a plurality of gear stages and shift control means for shifting the automatic transmission to a gear stage at which the output of the motor-generator is smaller than that of the prevailing gear stage.

In a control system for a vehicular drive unit, there is yet further provided an acceleration sensor for detecting an accelerator opening and a vehicle speed sensor for detecting a vehicle speed, wherein the shift control means has a shift map for setting the plurality of gear stages in accordance with the accelerator opening and the vehicle speed as outputted from the acceleration sensor and the vehicle speed sensor.

In a control system for a vehicular drive unit, the shift control means includes compute means for computing the outputs of the motor-generator individually at the plurality of gear stages and select means for selecting the gear stage, at which the output of the motor-generator is the minimum, from the result of computation of the compute means.

In a control system for a vehicular drive unit, there is even further provided an acceleration sensor for detecting an accelerator opening, and the shift control means includes demanded shift means for shifting according to the degree of change in the accelerator opening when the degree of change in the accelerator opening is over a predetermined value.

In a control system for a vehicular drive unit, there is further provided battery residue detecting means for detecting the residue of the battery, and the shift control means includes shift correcting means for shifting in response to the output signal from the battery residue detecting means so that the battery residue may fall within a proper range.

BRIEF DESCRIPTION OF THE DRAWINGS

The invention will be described with reference to the figures, in which:

FIG. 3 is a schematic diagram showing a second power train of the vehicular drive unit according to an embodiment of the invention;

FIG. 4(*b*) presents a velocity diagram of the drive unit of FIG. 4(*a*);

DETAILED DESCRIPTION OF THE PREFERRED EMBODIMENT

Figure 1:
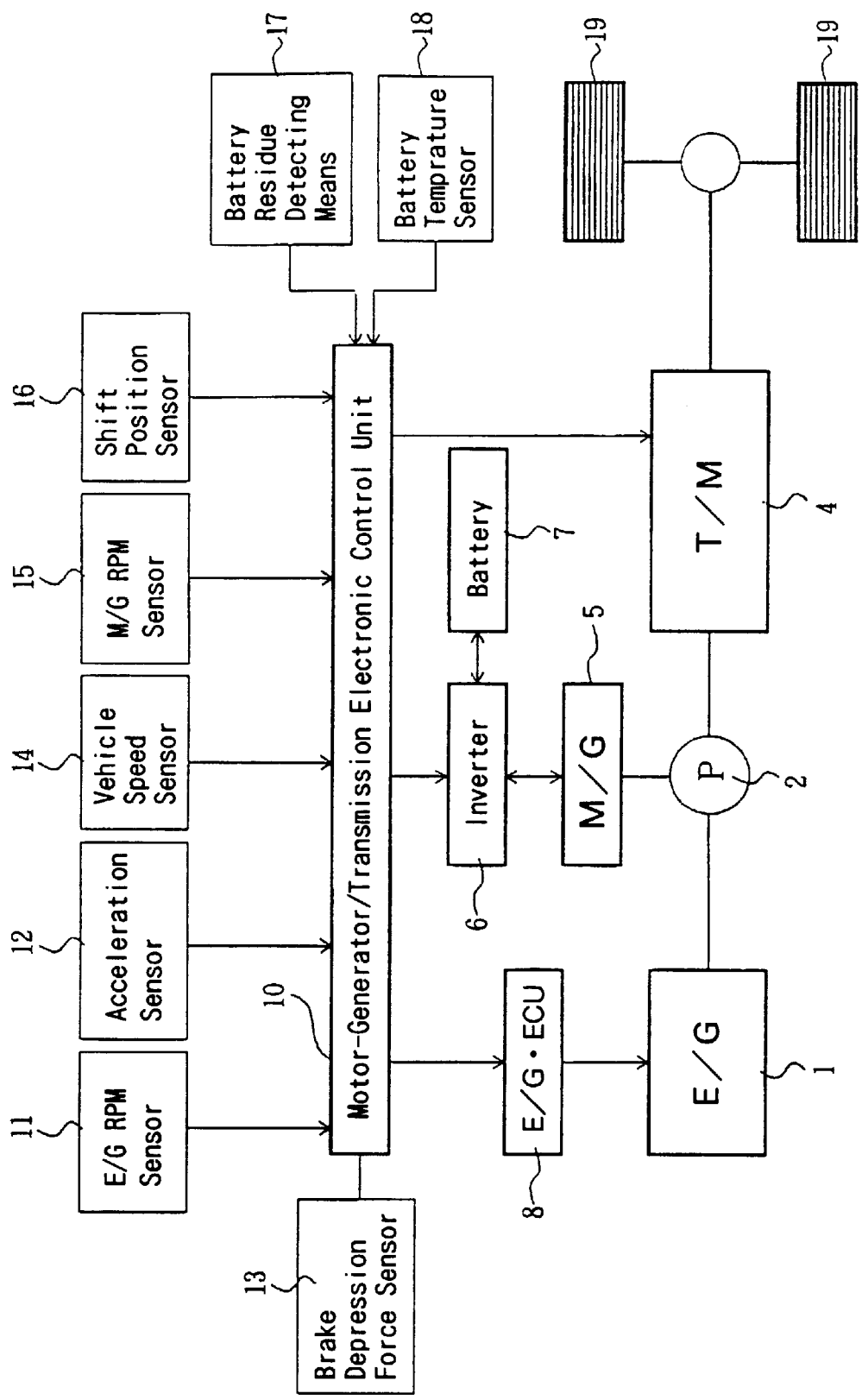
FIG. 1 is a block diagram showing a vehicular drive unit according to an embodiment of the invention.

Here will be described an embodiment of the invention with reference to the accompanying drawings.

Referring to FIGS. 1–5, reference numeral 1 designates an engine (E/G), and numeral 2 designates a power transmission (P). This power transmission (or power distribution mechanism) 2 includes, briefly, a planetary gear composed of at least three rotary elements; and an apply means for connecting/disconnecting the rotary elements selectively, such as an input clutch Ci 24 and a direct-coupled clutch Cd 25. (The details of the power transmission 2 will be described hereinafter.) Numeral 4 designates an automatic transmission (T/M) to be connected to the power transmission 2; numeral 5 designates a motor-generator (M/G) acting as a motor and a generator and connected to the power transmission 2; numeral 6 designates an inverter to be connected with the motor-generator 5; numeral 7 a battery to be connected with the inverter 6; numeral 8 an engine electronic control unit (E/G·ECU) for controlling the engine 1; numeral 10 a motor-generator/transmission electronic control unit; numeral 11 an engine RPM sensor; numeral 12 an acceleration sensor; numeral 13 a brake depression force sensor; numeral 14 a vehicle speed sensor; numeral 15 a motor generator RPM sensor; numeral 16 a shift position sensor; numeral 17 a battery residue detecting means; numeral 18 a battery temperature sensor; and numerals 19 wheels.

Incidentally, the automatic transmission (T/M) 4 is a four-speed automatic transmission which includes a clutch C0, a clutch C1, a clutch C2, a one-way clutch F0, a one-way clutch F1, a one-way clutch F2, a brake B0, a brake B1, a brake B2, a brake B3, and planetary gears PG1 to PG3 or a brake Br.

Thus, the vehicular drive unit according to the present invention includes the engine 1; the power transmission 2 connected to the output shaft 3 of the engine 1 for acting as the power distribution mechanism to distribute the drive power; the motor-generator 5 connected to the power transmission 2; the battery 7 for storing electric power, as generated by the motor-generator 5, through the inverter 6 and for feeding the electric power for drive; the battery residue detecting means 17 for detecting the residue of the battery; and control means for controlling the engine 1, the motor-generator 5 and the power transmission 2 in response to the output signal of the battery residue detecting means 17. The planetary gear connects a first rotary element (or ring gear) 21 to the output shaft 3 of the engine 1. A second rotary element (or sun gear) 22 reacts against the first rotary element to drive the motor-generator 5. A third rotary element (or carrier) 23 supports a plurality of pinion gears 27 to drive an output member 26 for transmitting the drive power to the wheels 19. Incidentally, the numeral 24 designates the input clutch Ci, and the numeral 25 designates the direct-coupled clutch Cd.

Figure 2:
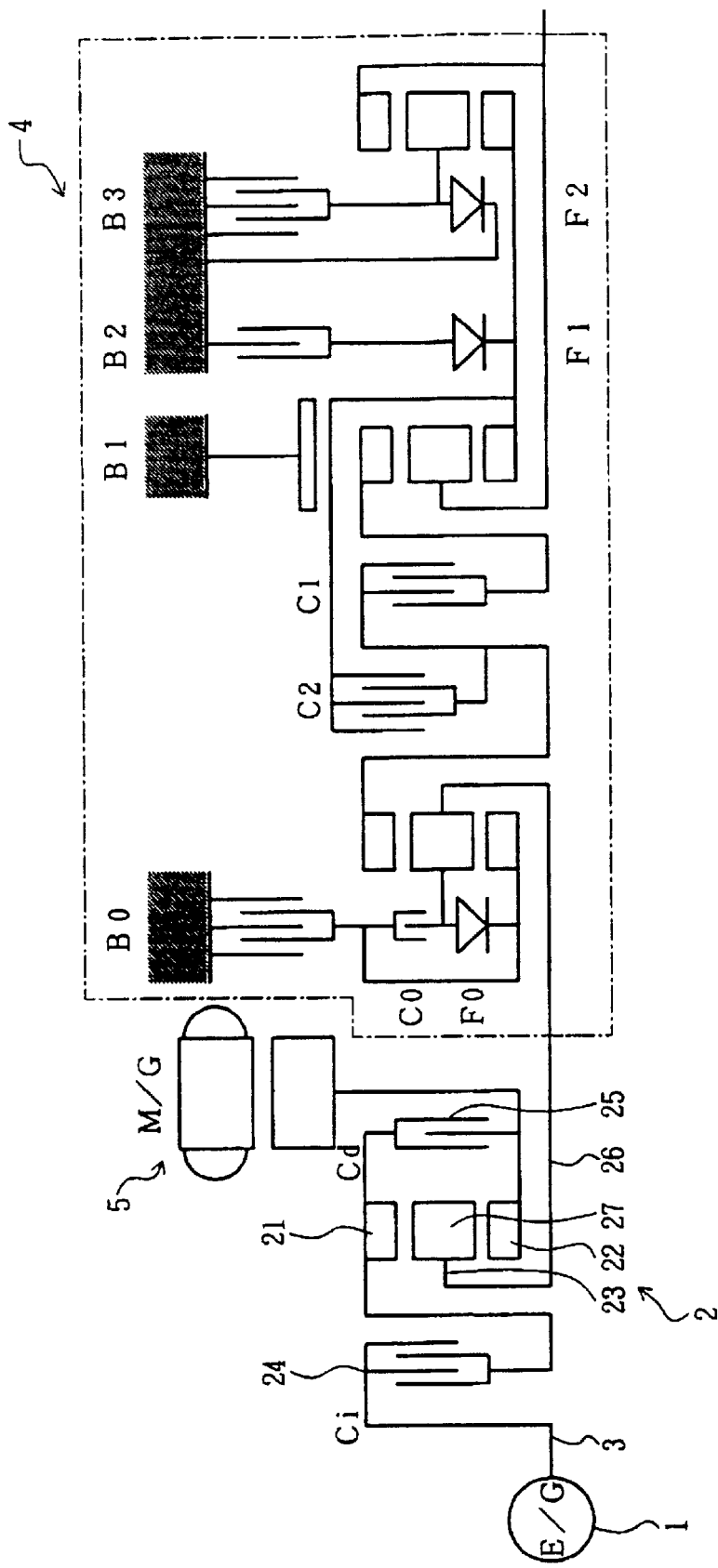
FIG. 2 is a schematic diagram showing a first power train of the vehicular drive unit according to an embodiment of the invention.

Here, the first power train of the vehicular drive unit, as shown in FIG. 2, is equipped with the power transmission 2 including the planetary gears, input clutch Ci 24, the direct-coupled clutch Cd 25, and the four-speed automatic transmission known in the prior art. As the speed changing operations of the power transmission are similar to those of the prior art, they will not be described.

The second power train, as shown in FIG. 3, eliminates the reverse frictional engagement element of the four-speed automatic transmission of the prior art and mounts a reverse frictional engagement element (or reverse brake Br) in the power transmission 2. As a result, the reverse stage is achieved by releasing the input clutch Ci 24 but applying the reverse brake Br to drive the motor-generator 5 backward while leaving the automatic transmission at the forward stage. Incidentally, the speed changing operations for the forward travel are similar to those of the prior art, and their detailed description will be omitted.

According to the invention, in the operation level control of the engine by the motor-generator 5, the motor-generator control means 10 causes the motor-generator 5, -when the output value of the motor-generator 5 corresponding to the target output value of the engine 1 is within the outputtable region of the motor-generator 5, to output a reaction torque corresponding to the output torque of the engine 1. In the alternative, when the output value of the motor-generator 5 corresponding to the target output value of the engine 1 is outside of the outputtable region of the motor-generator 5, the motor-generator control means 10 changes the target output value of the engine 1 such that the output value of the motor-generator 5 corresponding to the target output value may fall within the outputtable region of the motor-generator 5, and such that the output of the motor-generator changes in accordance with the changed target output value.

Figure 4A:
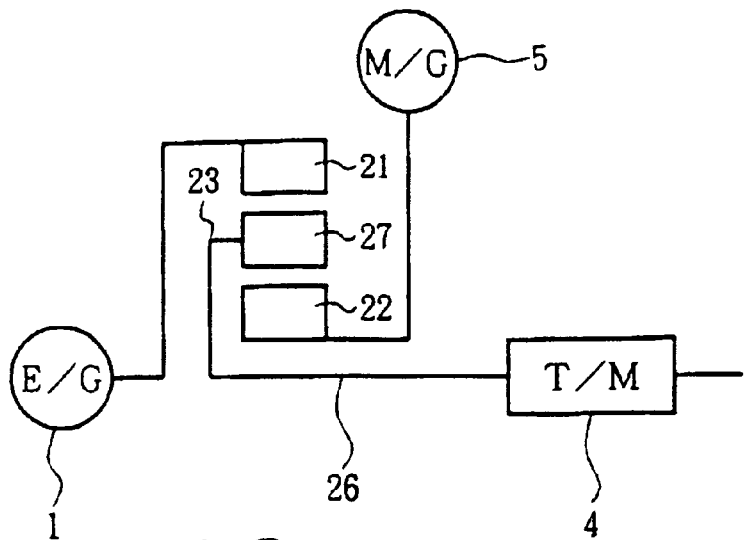
FIG. 4(*a*) presents a split portion (or planetary gear) of the vehicular drive unit according to an embodiment of the invention.
Figure 4B:
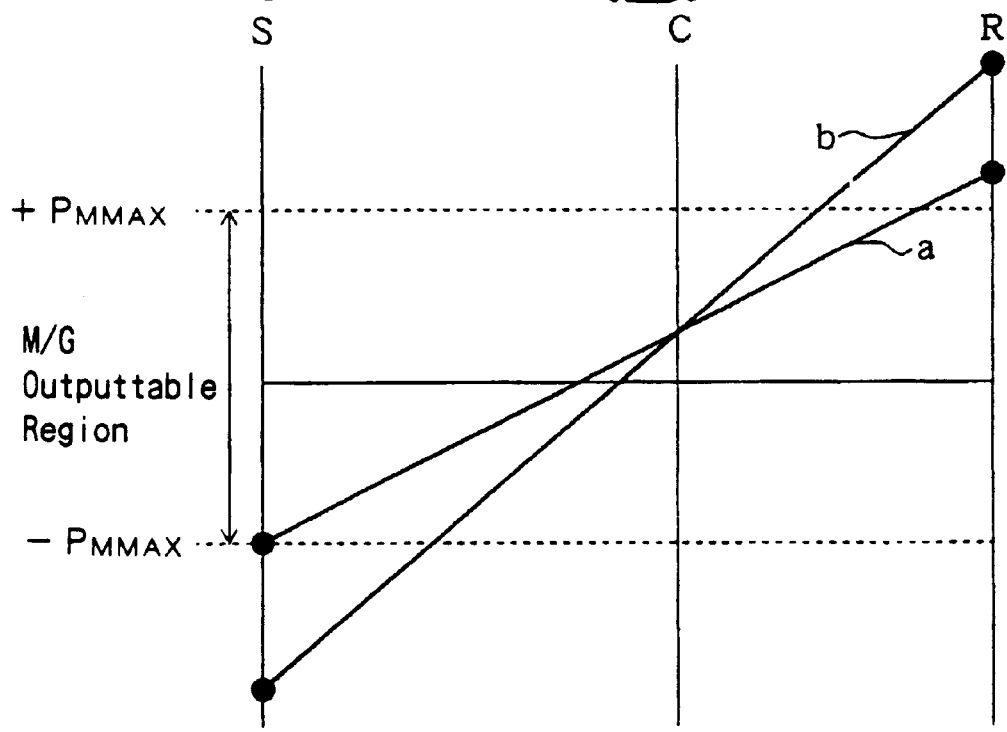

FIG. 4(b) presents a velocity diagram for a constant output torque $T_E$ of the engine and illustrates the outputtable region of the motor-generator 5. In FIG. 4 (b), the output value of the motor-generator is within the outputtable region for the engine output value, as plotted by line a, but is outside for the engine output value, as plotted by line b. Here, the outputtable region of the motor-generator is between the maximum output $+P_{MMAX}$ at the motor drive time and the maximum output $-P_{MMAX}$ at the generation time.

When the planetary gear, as shown in FIG. 4(a), is connected in the split state, the output of the engine is divided into a portion to be absorbed by the motor-generator and a portion to be consumed by the running resistance of the vehicle.

Figure 5:
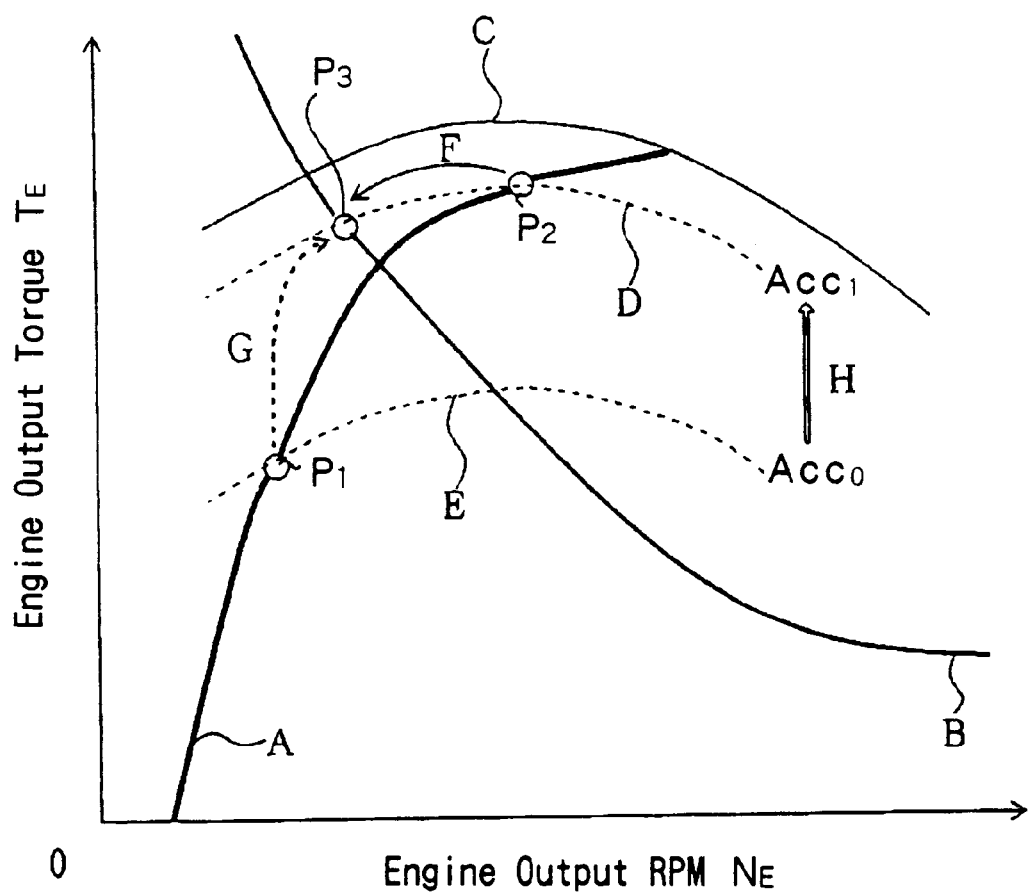
FIG. 5 is a diagram illustrating a method of controlling the vehicular drive unit according to an embodiment of the invention.

FIG. 5 plots together the output operation curve of the engine, and the curve which indicates the output of the engine corresponding to the maximum output of the motor-generator considering the running resistance of the vehicle. By this figure, it is possible to compare the target output value of the engine with the region of engine output corresponding to the outputtable region of the motor-generator considering the running resistance of the vehicle directly. This being the case, it is also possible to compare the target output value of the engine with the outputtable region of the motor-generator indirectly.

In FIG. 5, the letter A indicates the best mileage curve of the engine, the letter B the curve which indicates the output of the engine corresponding to the maximum output of the motor-generator considering the running resistance of the vehicle, the letter C is an operation curve of the engine when the accelerator pedal is fully depressed, the letter D is an operation curve of an accelerator opening $Acc_1$ (outside of the outputtable region), the letter E is an operation curve of an accelerator opening $Acc_0$ (within the outputtable region), the letter F is a change in the target output value of the engine, the letter G is an actual shift of the engine output, and letter H a change in the accelerator opening from $Acc_0$ to $Acc_1$.

For the accelerator opening $Acc_0$, as shown in FIG. 5, the engine target output value $P_1$ is within the region of curve B so that the engine can be run on the best mileage curve A. For the accelerator opening $Acc_1$, however, the engine target output value $P_2$, as located on the best mileage curve, exceeds the region of curve B. Therefore, the engine target output value is changed from $P_2$ to $P_3$ so that it may be within the region of curve B while being on curve D of equal accelerator opening, and the output value of the motor-generator is changed so that the engine may operate at the target output value $P_3$.

As a matter of fact, the engine output moves on curve G but does not exceed the region of curve B when the accelerator opening is changed from $Acc_0$ to $Acc_1$. On the other hand, curve B indicates the sum of the maximum output value of the motor-generator and the running resistance, which is expressed by the sum of a velocity resistance (or aerodynamic resistance), a rolling resistance, an acceleration resistance and an hill-climbing resistance. At the start of zero vehicle speed, the running resistance is zero so that curve B takes the maximum output value owned by the motor-generator, and the region of curve B is enlarged with the increase in the running resistance, for example, vehicle speed.

According to this structure, the engine 1 can be run on the best mileage curve A according to the accelerator opening. When the planetary gear portion is in the split state, on the other hand, the motor-generator 5 can be caused to generate electric power so that the kinetic energy of the second rotary element 22 of the planetary gear can be stored as electric power which can be effectively used for driving the accessories and assisting the engine 1. When the output value of the motor-generator 5, as corresponding to the target output value of the engine 1, exceeds the outputtable region of the motor-generator 5, the target output value of the engine 1 is changed so that the output value of the motor-generator 5 corresponding to that target output value may fall within the outputtable region. Additionally, the output of the motor-generator 5 is changed so that the engine 1 can operate at the changed target output value. As a result, it is sufficient to give the necessary minimum capacity to the motor-generator 5. On the other hand, the output value of the engine 1 is changed by the change in the output of the motor-generator 5 so that a throttle control mechanism, such as a sub-throttle mechanism, need not be added.

Next, as to the change in the target value of the engine, the motor-generator control means 10 changes the target output value of the engine 1 when the output value of the motor-generator 5 corresponding to the target output value of the engine 1 exceeds the outputtable region of the motor-generator 5. This assures that the output value of the motor-generator 5 corresponding to the target output value may lie on the maximum outputtable curve of the motor-generator 5 and changes the output of the motor-generator 5 in accordance with the changed target output value.

Next, as to the shift point control, there is further provided: the automatic transmission 4 connected to the output member 26 for establishing a plurality of gear stages; and shift control means for shifting the automatic transmission 4 so that the output of the motor-generator 5 may take a gear stage lower than the present one.

When the automatic transmission 4 is shifted up, the input RPM of the automatic transmission 4 drops so that the RPM of the motor-generator 5 drops, too. At a downshift, on the other hand, the input RPM rises so that the RPM of the motor-generator 5 rises as well. In other words, for a constant output torque of the motor-generator 5, the output of the motor-generator 5 can be changed by shifting the automatic transmission 4. According to the invention, therefore, the speed is so changed by the shift control means that the output of the motor-generator 5 may decrease. As a result, the loss of energy due to the conversion efficiency of the motor-generator 5 can be reduced to improve the mileage.

Next, as to the shift point control by a shift map, there is provided the acceleration sensor 12 for detecting the accelerator opening and the vehicle speed sensor 14 for detecting the vehicle speed. The shift control means 10 has a shift map (see FIG. 13) for setting the shift points of the plurality of gear stages in accordance with the accelerator opening and the vehicle speed as outputted from the acceleration sensor 12 and the vehicle speed sensor 14.

Next, as to the shift point control by computations, the shift control means 10 includes compute means for determining the individual outputs of the motor-generator 5 at the plurality of gear stages by computations, and select means for selecting the gear stage at which the minimum output of the motor-generator 5 is obtained as a result of the computations by the compute means.

Next, as to the demanded acceleration shift, there is provided: the acceleration sensor for detecting the accelerator opening, and the shift control means 10 includes demand shift means to change the speed according to the degree of change in the accelerator opening when it is determined based upon the output signal from the acceleration sensor 12 that the degree of change in the accelerator opening is over a predetermined value.

Next, as to the shift correction based on the SOC, there is further provided a battery residue detecting means 17 for detecting the residue of the battery 7, and the shift control means 10 including shift correcting means for effecting a shift in response to the output signal from the battery residue detecting means 17 such that the battery residue may be within a proper range.

Moreover, the drive unit of the invention is equipped, as the power for driving the vehicle, with the engine 1 to be operated by consuming fuel and the motor-generator 5 to be operated by consuming electric power of the battery 7. As a result, the motor-generator 5 can be used while suppressing the operation of the engine 1, so as to improve the mileage, and the drive of the engine 1 can be increased to increase the charge of the battery 7. From the standpoint of the entire drive unit, however, using more than one of them will lead to a useless consumption of the energy (e.g., either fuel or electric power). In other words, the mileage (or fuel consumption rate) is improved by using the motor more, but the electric power is consumed more than necessary so that the mileage (or energy consumption rate) of the entire unit is deteriorated.

Therefore, the power generation and the drive of the motor-generator 5 is balanced (to equalize the distribution between the drive state and the generation state to keep the charge of the battery 7 substantially constant) by making a shift to reduce the output of the motor-generator 5.

On the other hand, the residue of the battery 7 is directly detected to balance the power generation and the drive of the motor-generator 5.

The individual control examples of the control unit for the aforementioned vehicular drive unit will be described with reference to the flow charts of FIGS. 6–12.

Figure 6:
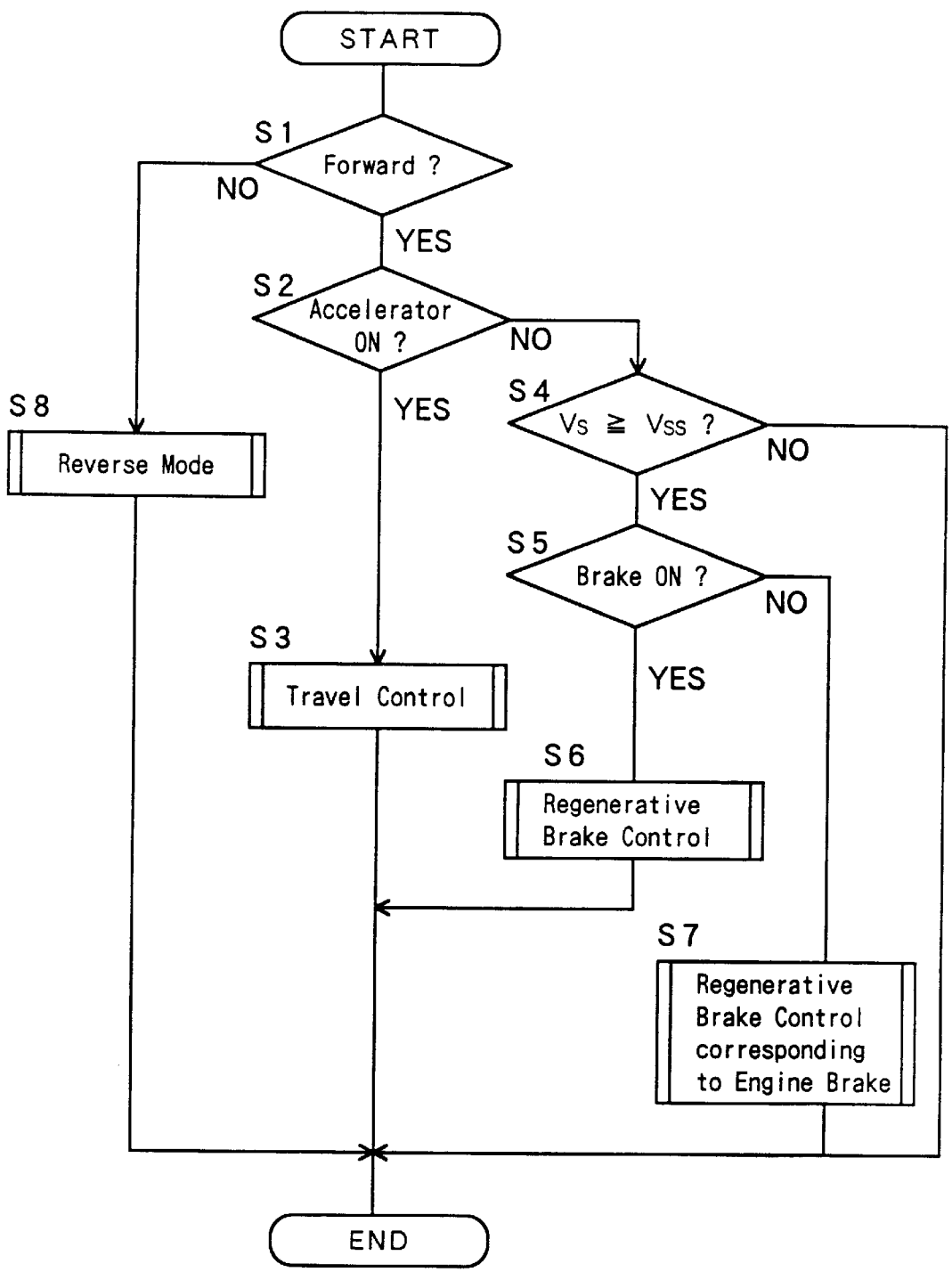
FIG. 6 is a (main routine) flow chart for vehicle control according to an embodiment of the invention.

FIG. 6 is the main routine flow chart for a vehicle control according to an embodiment of the invention.

First of all, the vehicle control checks (at Step S1), using the information from the shift position sensor 16, whether the selected range belongs to the forward range (D, 2 or L).

Next, if the answer of Step S1 is YES, the control checks (at Step S2), using the information from the acceleration sensor 12, whether the accelerator pedal is operated.

Next, if the answer of Step S2 is YES, that is, if it is determined based upon the information from the acceleration sensor 12 that the accelerator is operated, the routine enters the subroutine for travel control (at Step S3).

If the answer of Step S2 is NO, that is, if the accelerator is not operated, it is decided (at Step S4) on the basis of information from the vehicle speed sensor 14 whether the vehicle speed Vs is over a predetermined value Vss (or substantial zero).

If the answer of Step S4 is YES, it is decided (at Step S5), based upon the information from the brake depression sensor 13, whether the brake pedal is depressed.

If the answer of Step S4 is NO, on the other hand, the routine is ended.

If the answer of Step S5 is YES, that is, if the brake pedal is depressed, the routine enters the subroutine at Step S6, for controlling the regenerative brake in accordance with the depression of the brake.

If the answer of Step S5 is NO, that is, if the brake pedal is not depressed, the routine enters the subroutine at Step S7, for controlling the regenerative brake corresponding to the engine brake.

If the answer of Step S1 is NO, that is, if the range is not in the forward range, the routine enters the subroutine for the reverse mode at Step S8.

The travel control according to the embodiment of the invention will now be described.

Figure 7:
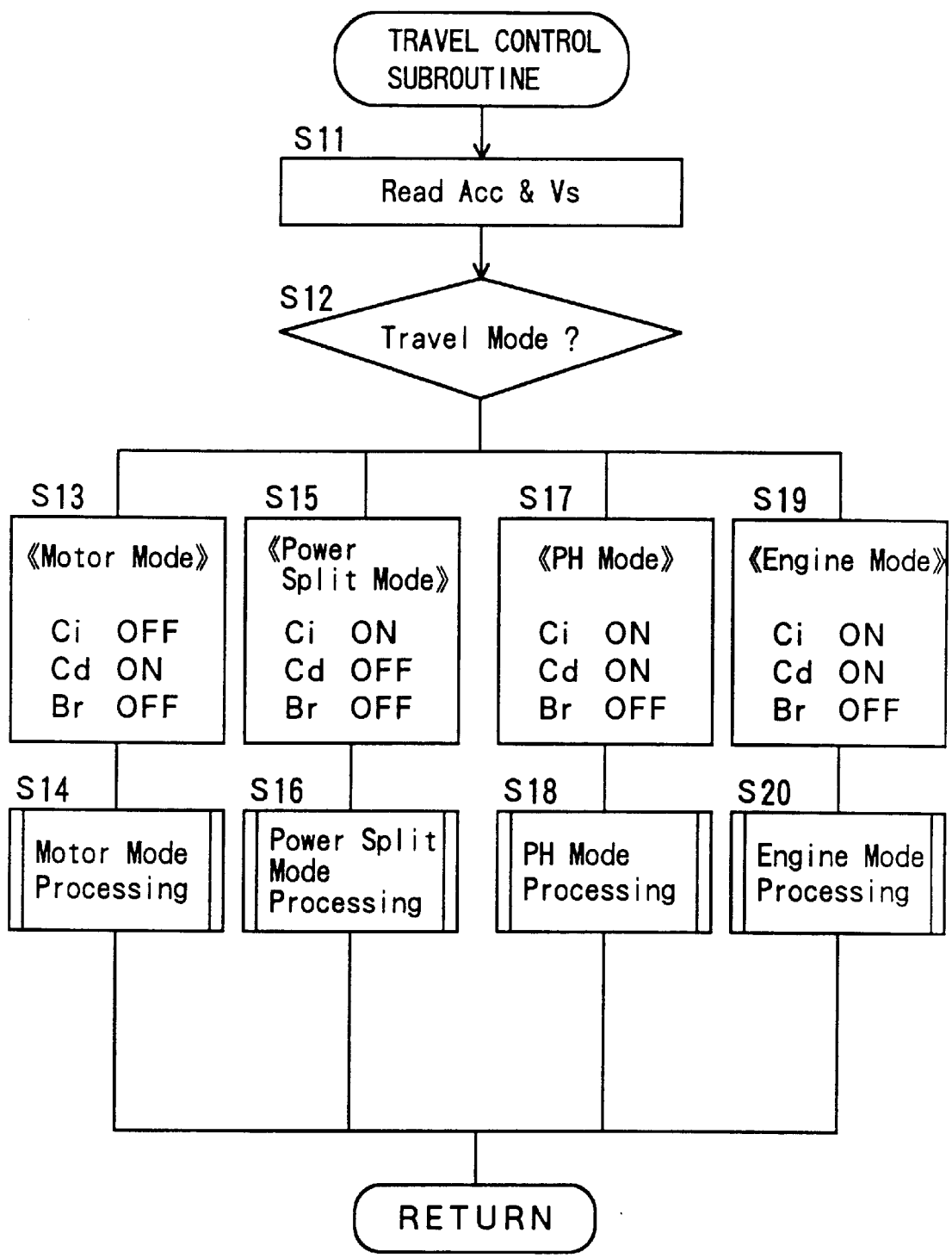
FIG. 7 is a (subroutine) flow chart of a travel control according to an embodiment of the invention.

FIG. 7 is a subroutine flow chart for travel control according to the embodiment of the invention.

First of all, the accelerator opening Acc and the vehicle speed Vs are read at Step S11 from the acceleration sensor 12 and the vehicle speed sensor 14, respectively.

Next, the travel mode is determined at Step S12 from a preset travel pattern map (FIG. 13) based upon the accelerator opening Acc and the vehicle speed Vs. Incidentally, this travel pattern map is set with an acceleration switch curve (as indicated by a bold line) and a deceleration switch curve (as indicated by a single-dotted line) so that the individual modes may be switched at different points for the acceleration and the deceleration. Moreover, each mode is set (in the shift map) with the later-described shift points of the transmission.

The motor mode is established at Step S13, by turning OFF the input clutch Ci 24, turning ON the direct-coupled clutch Cd, and turning OFF the reverse brake Br.

The motor mode processing is entered at Step S14.

The power split mode is established at Step S15. For this the input clutch Ci 24 is turned ON; the direct-coupled clutch Cd 25 is turned OFF; and the reverse brake Br is turned OFF.

The power split mode processing is entered at Step S16. The parallel hybrid (PH) mode is established. For this the input clutch Ci 24 is turned ON; the direct-coupled clutch Cd 25 is turned ON; and the reverse brake Br is turned OFF (at Step S17). Here, in the parallel hybrid mode, the split portion is directly coupled so that the engine 1 and the motor-generator 5 are commonly used.

The parallel hybrid (PH) mode processing is entered at Step S18.

The engine mode is established, at Step S19, by turning ON the input clutch Ci 24, turning ON the direct-coupled clutch Cd 25, and turning OFF the reverse brake Br and the engine mode processing is entered at Step S20.

Here will be described the power split mode (or the control by the shift schedule) according to the embodiment of the invention.

Figure 8:
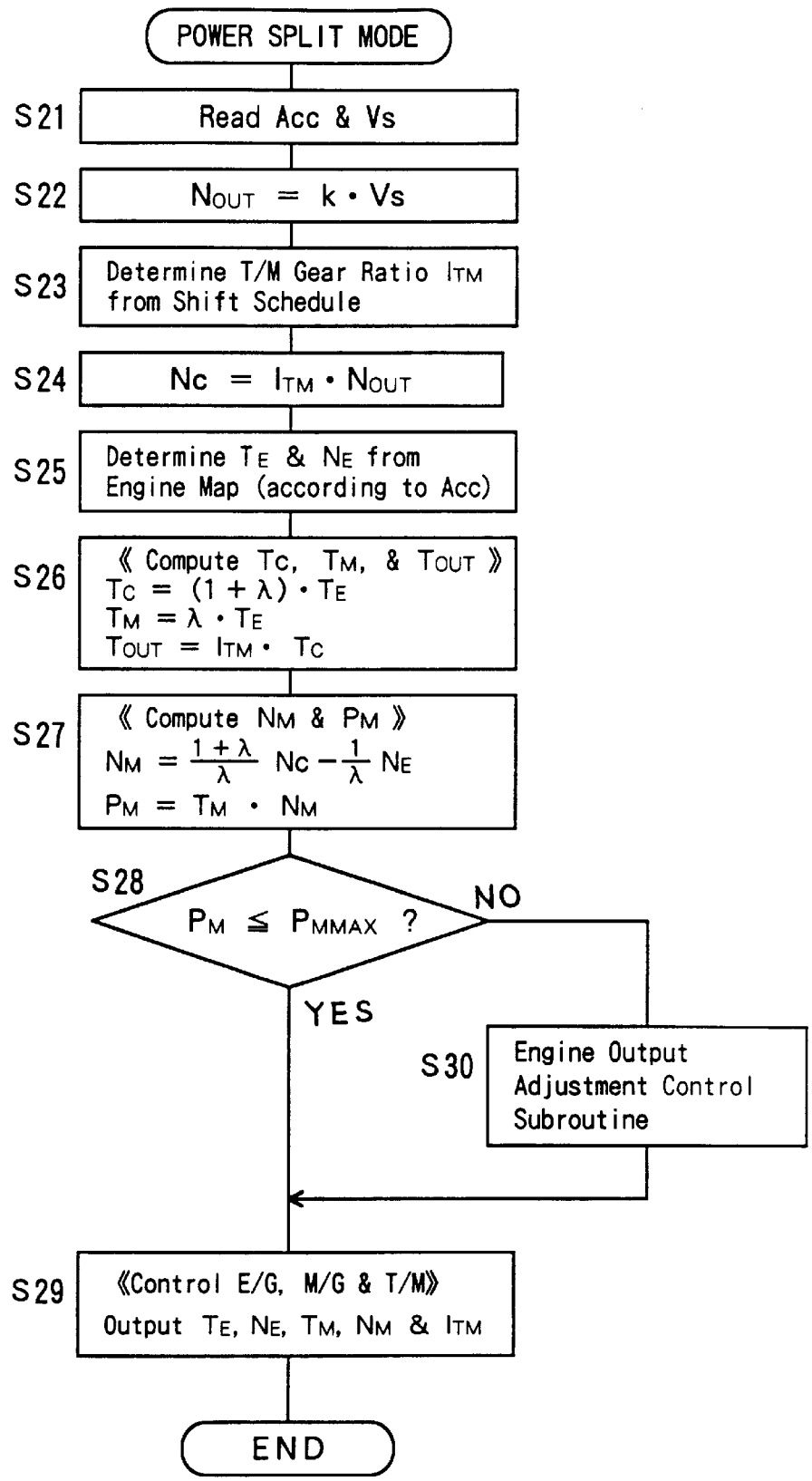
FIG. 8 is a (subroutine) flow chart of a control by a shift schedule according to an embodiment of the invention.

FIG. 8 is a subroutine flow chart for control by a shift schedule according to the embodiment of the invention.

First of all, the accelerator opening Acc is read from the acceleration sensor 12 and the vehicle speed Vs is read from the vehicle speed sensor 14 at Step S21. Next at Step S22, the output speed $N_{OUT}$ of the automatic transmission 4 is computed from the vehicle speed Vs and a reduction coefficient K.

Figure 13:
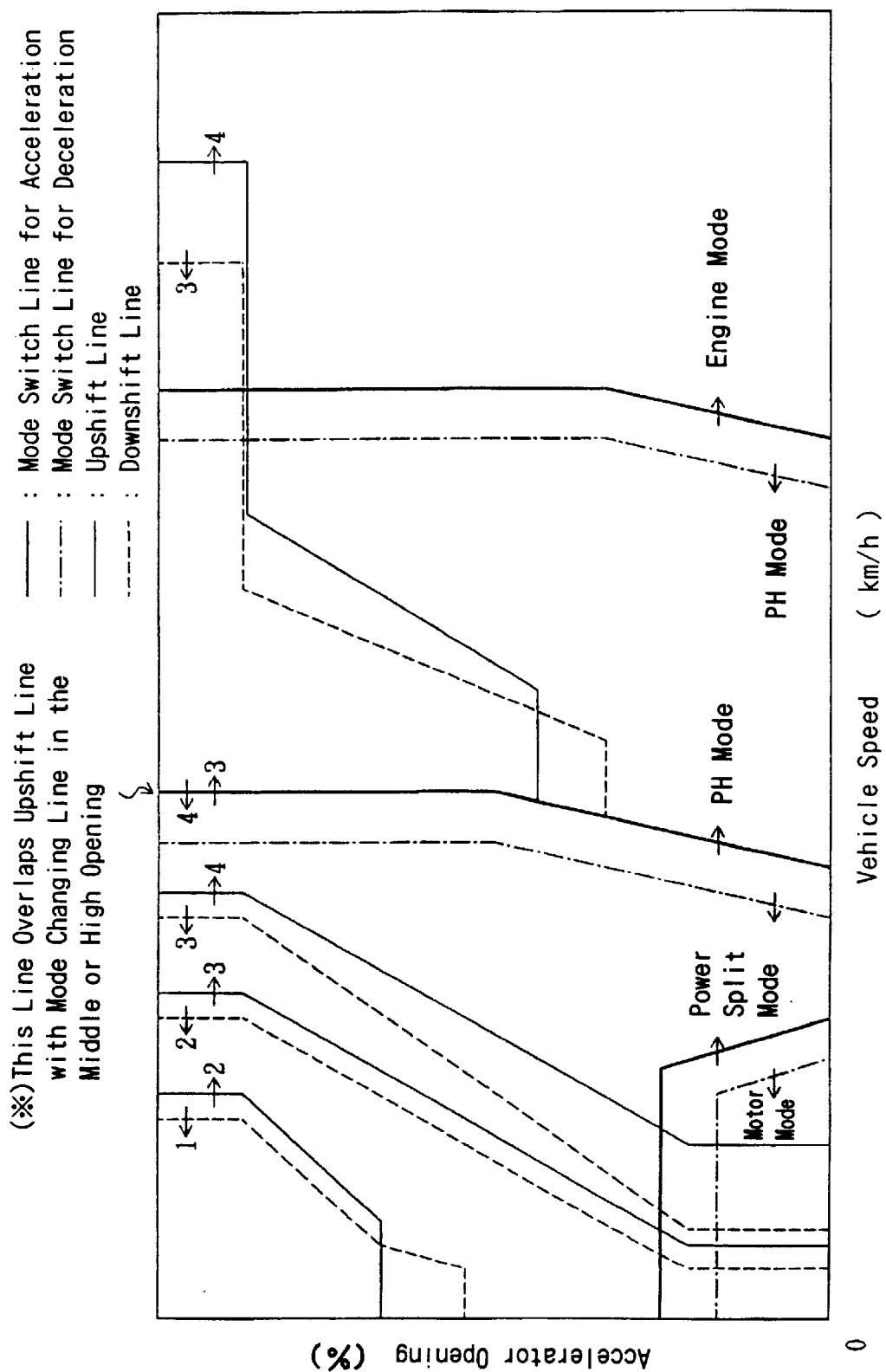
FIG. 13 is a diagram showing an example of the travel mode pattern including an exemplary shift map according to an embodiment of the invention.

Next, the gear stage (or gear ratio) $I_{TM}$ is determined at Step S23 from the accelerator opening Acc and the output speed $N_{OUT}$, as determined at Steps S21 and S22, by the shift map which is so preset in the parallel hybrid mode region of the travel pattern map of FIG. 13 as to reduce the output of the motor-generator 5.

Next, the input RPM $N_C$ of the automatic transmission 4 is determined at Step S24 by multiplying the gear ratio $I_{TM}$ and the output RPM $N_{OUT}$, the gear ratio being determined at Step S23.

Next, the output torque $T_E$ of the engine 1 and the engine RPM $N_E$ according to the accelerator opening Acc are determined at Step S25 from the preset engine map. In short, the target operation point of the engine 1 is determined from the accelerator opening and the engine map.

Next, the input torque $T_C$ of the automatic transmission 4 and the torque $T_M$ of the motor-generator (M/G) 4 are computed from the output torque TE of the engine. Then, the output torque $T_{OUT}$ of the automatic transmission 4 is computed at Step S26 from the determined input torque $T_C$ and gear ratio $I_{TM}$ of the automatic transmission 4.

Next, the motor-generator RPM $N_M$ is computed from the input RPM $N_C$ of the automatic transmission 4 and the engine RPM $N_E$, as determined at Steps S24 and S25. Then, the output PM of the motor is determined, at Step S27, from the motor torque $T_M$ and the motor RPM $N_M$. In short, the motor torque $T_M$, the motor RPM $N_M$ and the motor output PM which are to be borne by the motor are computed.

Next, it is determined, at Step S28, whether the motor output $P_M$, determined at Step S27, is below the maximum output $P_{MMAX}$ of the motor, that is, whether the motor output is below the motor-generator capacity.

Next, if the answer of Step S28 is YES, the engine 1, the motor-generator 5 and the automatic transmission 4 are controlled at Step S29 to output the torque, RPM and gear stage, as determined at Steps S23 to S27. In short, the engine 1, the motor-generator 5 and the automatic transmission 4 are controlled to establish the operation point determined above.

If the answer of Step S28 is NO, the output of the engine 1 is re-adjusted (at Step S30) to set the output PM less than the value $P_{MMAX}$. In other words, another computation is executed by lowering the target operation point of the engine 1.

Figure 9:
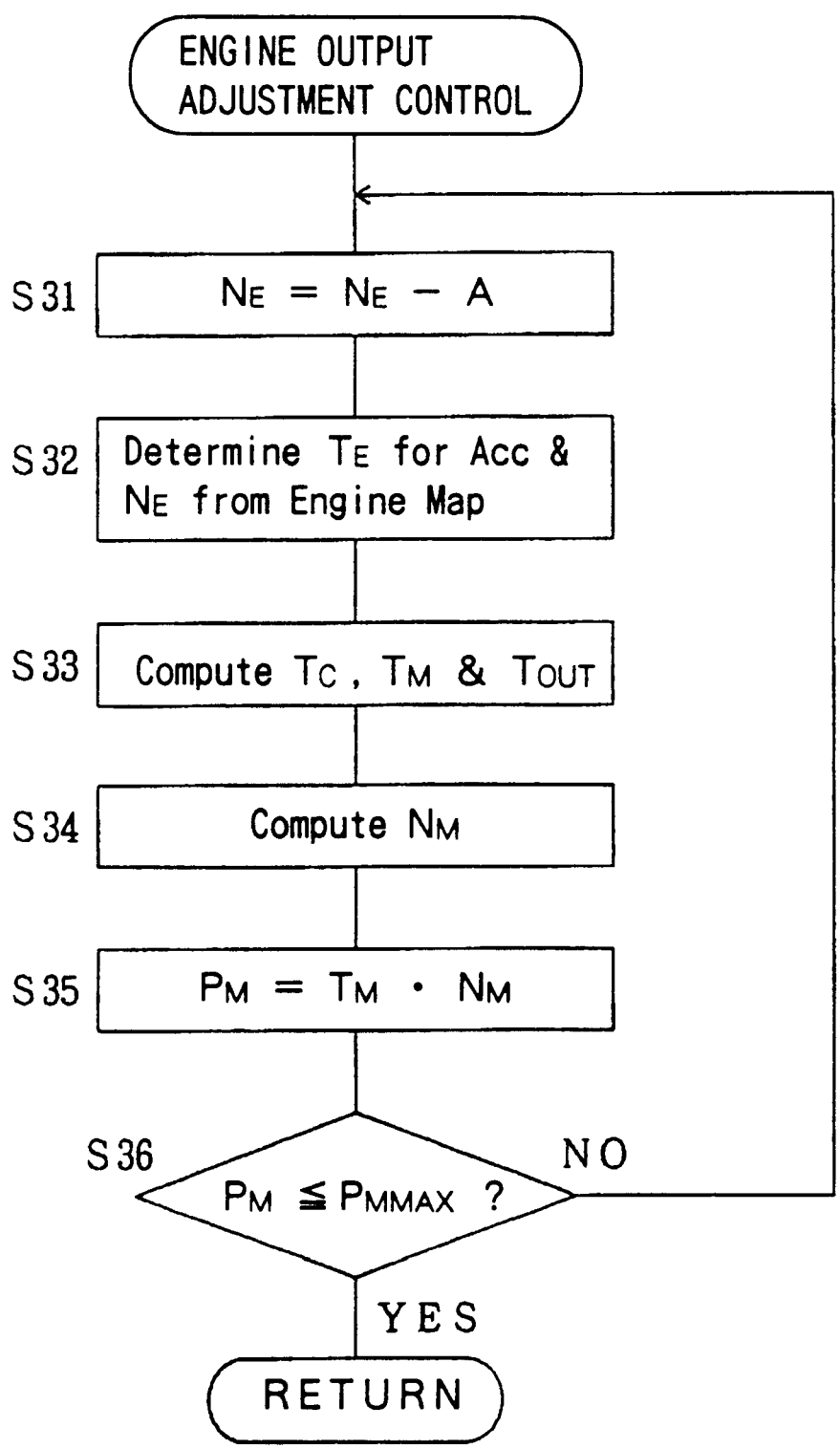
FIG. 9 is an engine output adjusting flow chart according to an embodiment of the invention.

This control will be described with reference to the engine output adjusting subroutine of FIG. 9. FIG. 9 is an engine output adjusting flow chart according to the embodiment of the invention.

First of all, the engine RPM $N_E$ is lowered by a preset value A (e.g., 200 RPM) at Step S31. The engine output torque $T_E$ according to the accelerator opening Acc and the engine RPM $N_E$ is determined at Step S32 from a preset engine map derived from FIG. 5.

Like Step S26, the input torque $T_C$ of the automatic transmission 4, the output torque $T_{OUT}$ of the automatic transmission 4, and the motor torque $T_M$ are computed at Step S33.

Next, like Step S27, the motor RPM $N_M$ is determined at Step S34.

Next, like Step S27, the output PM of the motor is determined at Step S35. In other words, the motor torque TM, the motor RPM $N_M$ and the motor output PM to be borne by the motor, are computed again at Steps S33 to S35.

It is checked, at Step S36, whether the motor output $P_M$ determined at Step S35 is below the maximum $P_{MMAX}$. The routine is returned, if the answer of Step S36 is YES, but returns to Step S31, if NO, to lower the engine RPM $N_E$ repeatedly.

Here will be described a power split mode subroutine, for computation control, according to the embodiment of the invention.

Figure 10:
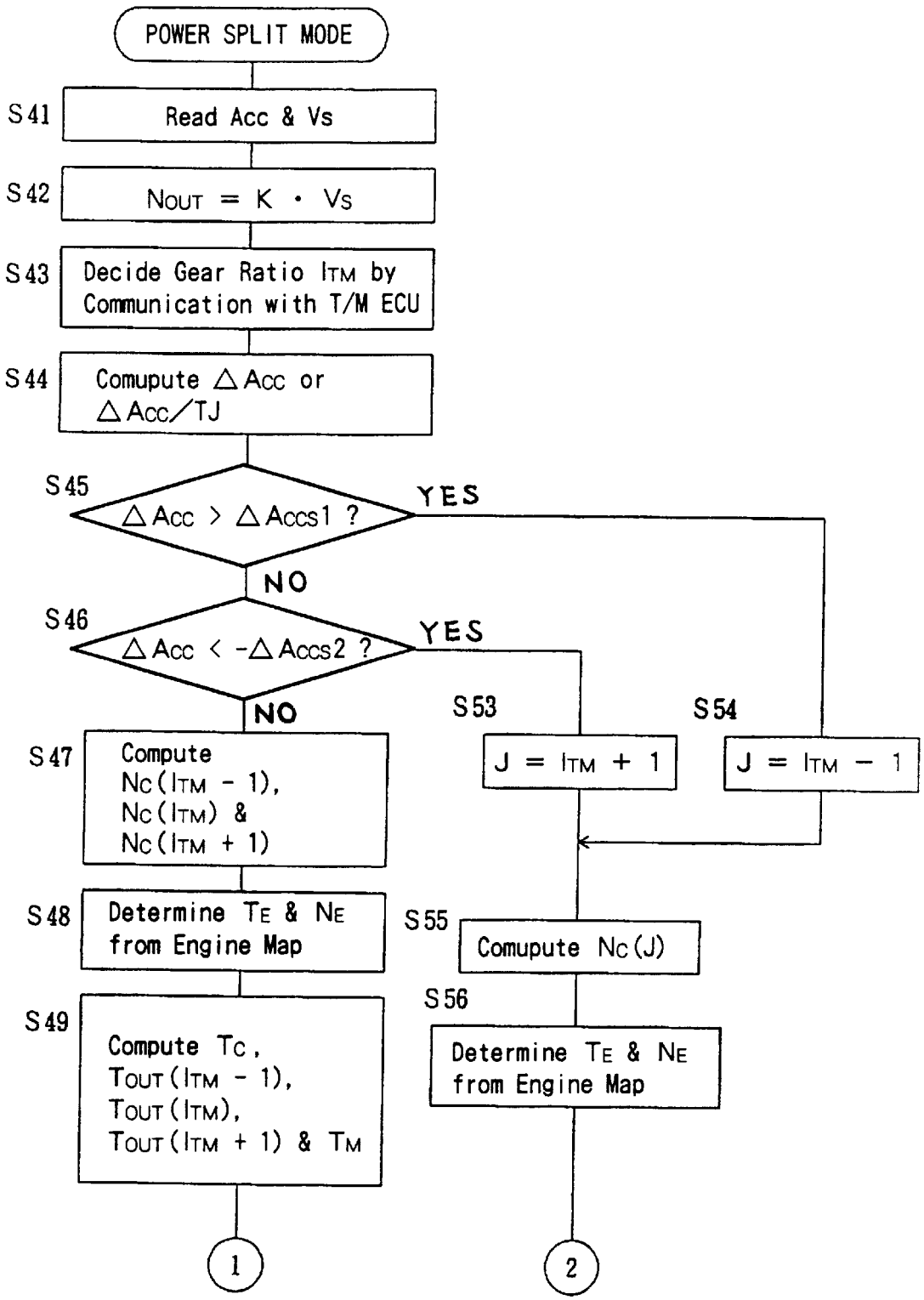
FIG. 10 is the first part of a flow chart for a power split mode subroutine (for computation control) according to an embodiment of the invention.
Figure 11:
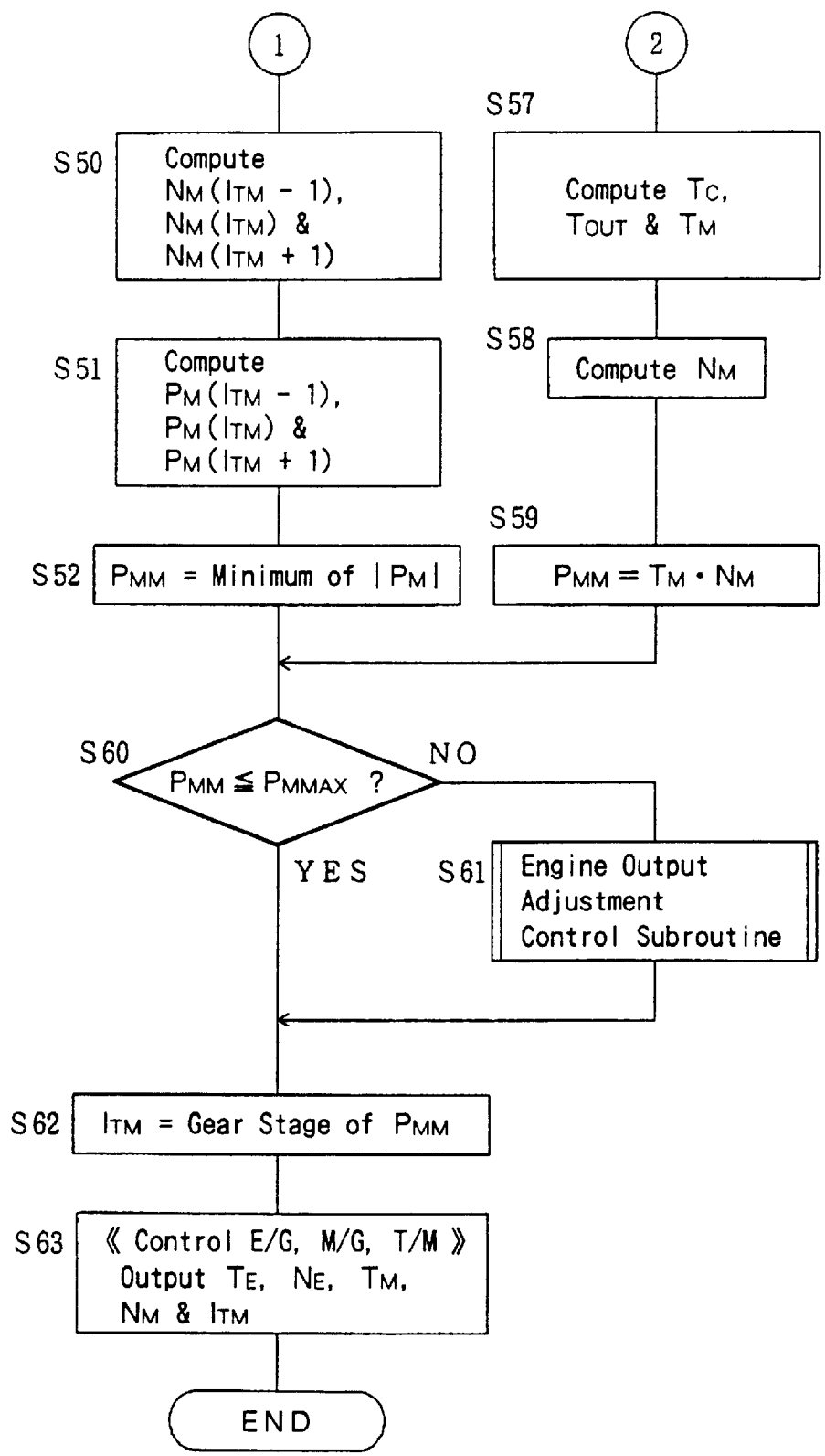
FIG. 11 is the first part of a flow chart for a power split mode subroutine (for computation control) according to an embodiment of the invention.

FIG. 10 is the first part of a flow chart of the power split mode subroutine, for computation control, according to the embodiment of the invention, and FIG. 11 is the second part of a flow chart of the power split mode subroutine, for computation control, according to the embodiment of the invention.

First of all, the accelerator opening Acc is read from the acceleration sensor 12, and the vehicle speed is read from the vehicle speed sensor 14 at Step S41.

Next, the output RPM $N_{OUT}$ of the automatic transmission 4 is computed, at Step S42, from the vehicle speed Vs and the reduction coefficient K.

Next, the prevailing gear stage (or gear ratio) $I_{TM}$ is determined at Step S43 from the transmission ECU 10.

Next, the change ΔAcc of the accelerator opening or its change rate ΔAcc/TJ (TJ: Time Period for Judgment) is computed at Step S44.

Next, it is decided, at Step S45, whether the change ΔAcc of the accelerator opening is over a specified value ΔAccs1 of the positive change.

If the answer of Step S45 is NO, it is determined at Step S46 whether the change ΔAcc in the accelerator opening is below a specified value -ΔAccs2 of the negative change.

If the answer of Step S46 is NO, both the positive and negative changes in the accelerator opening are small, and the ordinary gear stage is determined. The input RPMs $N_C$ of the automatic transmission 4 at the prevailing gear stage (or the gear ratio of $I_{TM}$), at the one-higher gear stage ($I_{TM}+1$) and at the one-lower gear stage ($I_{TM}-1$) are determined, at Step S47, as at Step S24.

Here, in the case of the automatic transmission 4 having four speeds, for example, the one-higher gear stage ($I_{TM}+1=5$) is not computed if the prevailing gear stage is the fourth speed. Nor is the one-lower gear stage ($I_{TM}-1=0$) computed if the prevailing gear stage is the first speed.

Like Step S25, the engine torque $T_E$ and the engine RPM NE, corresponding to the accelerator opening Acc, are determined (at Step S48) from the engine map.

Next, like Step S26, there are computed at Step S49 the input torque $T_C$ of the automatic transmission 4, the output torque $T_{OUT}$ for the individual three gear stages, of the automatic transmission 4, and the motor torque $T_M$.

Next, like Step S27, the motor RPM $N_M$, for the individual three gear stages, is determined at Step S50 of FIG. 11.

Next, like Step S27, the motor outputs $P_M$, for the individual three gear stages, are determined at Step S51.

The output $P_{MM}$, having the minimum absolute value, is selected at Step S52 from the three motor outputs PM, as determined at Step S51.

If the answer of Step S46 is YES (returning to FIG. 10), it is decided that the accelerator pedal is released, and an up-shift or the so-called "off-up-shift" is executed at Step S53.

If the answer of Step S45 is YES, it is decided that the accelerator pedal is fully depressed, and a downshift is executed to increase the output torque. In other words, the so-called "kick-down shift" is executed at Step S54.

The input RPM $N_C(J)$ of the automatic transmission 4 at the gear stage J, as set at Steps S53 and S54, is computed at Step S55.

Like Step S25, the engine output torque $T_E$ and the engine RPM $N_E$, as corresponding to the accelerator opening, are determined at Step S56 from the engine map.

Like Step S26, there are computed, at Step S57 of FIG. 11, the input torque $T_C$ of the automatic transmission 4, the output torque $T_{OUT}$ of the automatic transmission 4, and the motor torque $T_M$.

Next, like Step S27, the motor RPM $N_M$ is computed at Step S58.

Next, like Step S27, the motor output $P_{MM}$ is computed at Step S59.

Next, it is checked, at Step S60, like Step S28 whether the motor output $P_{MM}$, as determined at Steps S52 and S59, is below the maximum output $P_{MMAX}$.

If the answer of Step S60 is NO, the subroutine for adjusting the output of the engine 1 is entered at Step S61 as at Step S30.

If the answer of Step S60 is YES, the gear stage $I_{TM}$ of the automatic transmission 4 is set, at Step S62, to that of the output $P_{MM}$, as determined at Steps S52 and S59.

Next, like Step S29, the engine 1, the motor-generator 5 and the automatic transmission 4 are controlled at Step S63.

Although the description thus far covers the control by the change ΔAcc in the accelerator opening, an absolutely similar description can be applied to the change rate ΔAcc/TJ of the accelerator opening.

The correction control by the state-of-charge (SOC) according to the embodiment of the invention will now be described.

Figure 12:
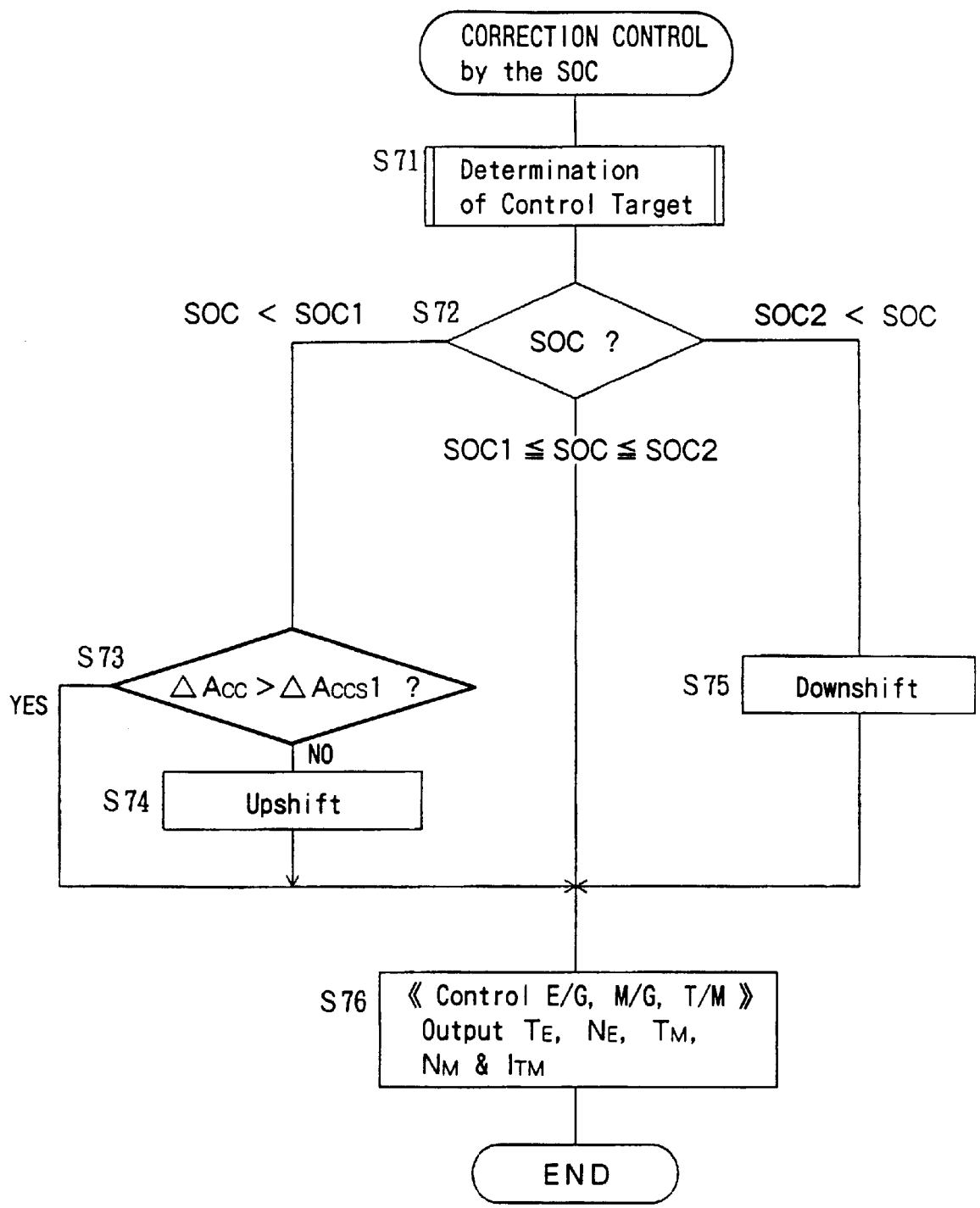
FIG. 12 is a flow chart for corrections based upon a state of charges (SOC) of a battery according to an embodiment of the invention.

FIG. 12 is a flow chart for corrections by the SOC according to an embodiment of the invention.

First of all, a control target is determined at Step S71. This processing corresponds to the foregoing Steps S41 to S62.

Next, the SOC is checked. Specifically, the SOC is divided, at Step S72, into three cases, in which it is below a lower limit SOC1, e.g., SOC=60%, between the lower limit SOC1 and an upper limit SOC2, e.g., SOC=85%, and over the upper limit SOC2.

If the SOC is below the lower limit SOC1, therefore, it is checked, at Step S73, whether the change $\Delta$Acc in the accelerator opening is over the specified value $\Delta$Accs1 of the positive change.

If the answer of Step S73 is NO, an up-shift of $I_{TM}=I_{TM}-1$ is executed at Step S74.

If the SOC is over the upper limit SOC2 at Step S72, a downshift of $I_{TM}=I_{TM}-1$ is executed at Step S75.

If the SOC is between the lower limit SOC1 and the upper limit SOC2 at Step S72, or if the answer of Step S73 is YES or if the downshift at Step S75 occurs, the engine 1, the motor-generator 5 and the automatic transmission 4 are controlled (at Step S76) as at the Steps S29 and S63.

According to the control system for a vehicular drive unit, the engine 1 is run on the best mileage curve according to the accelerator opening so that the mileage can be improved. When the planetary gear is brought into the split state, the motor-generator 5 is caused to generate electric power so that the kinetic energy of the second rotary element 22 of the planetary gear can be stored as electric power to drive the accessories and to assist the engine 1 effectively. When the output value of the motor-generator 5 corresponding to the target output value of the engine 1 exceeds the outputtable region of the motor-generator 5, the target output value of the engine 1 is so changed that the output value of the motor-generator 5 corresponding to the target value may fall within the outputtable region. Furthermore, the output of the motor-generator 5 is changed so that the engine 1 may operate with the changed target output value. As a result, it is sufficient to give the necessary minimum capacity to the motor-generator 5. Moreover, since the output value of the engine 1 is changed with the change in the output of the motor-generator 5, it is unnecessary to add a throttle control mechanism, such as the sub-throttle mechanism. As a result, it is possible to reduce and simplify the structure of the drive unit.

According to the control system, the target output value of the engine 1 is so changed that the output value of the motor-generator 5 corresponding to the target output value may take a value on the maximum outputtable curve. As a result, the target output value of the engine 1 can be set closest to the best mileage curve to minimize the fuel consumption rate. Moreover, the reduction in the output torque of the engine 1 due to the change in the target output value of the engine 1 can be minimized. That is, a change can be made to a point on the outputtable curve closest to the best mileage curve even in the outputtable region of the motor-generator 5.

According to the control system, the motor-generator 5 outputs a reaction torque against the output torque of the engine 1 and changes the RPM according to the vehicle speed. At the start of zero vehicle speed, the second rotary element 22, as connected to the motor-generator 5, revolves backward so that the revolution is lowered to zero by recovering the kinetic energy by the power generation. As the vehicle speed rises to reduce the RPM, the motor-generator 5 then acts as the motor to drive the second rotary element 22 forward.

However, when the kinetic energy is converted into electric power by the motor-generator 5 and vice versa, the recovered kinetic energy can not be converted to electric power by 100% due to the conversion efficiency of the motor-generator 5. In other words, even if a great amount of energy is recovered, some of it is lost while being converted.

By reducing the output of the motor-generator 5, therefore, the loss of energy due to the conversion efficiency can be minimized. By reducing the workload of the motor-generator 5, moreover, the drive balance between the engine 1 and the motor-generator 5 can be held to suppress the change in the charge of the battery 7 to thereby improve the mileage.

When the automatic transmission is shifted up, the input RPM of the automatic transmission 4 drops to lower the RPM of the motor-generator 5. When shifted down, on the other hand, the input RPM rises to raise the RPM of the motor-generator 5. For a constant output torque of the motor-generator 5, the output of the motor-generator 5 can be changed by shifting the automatic transmission 4. According to the invention, therefore, the speed is so changed by the shift control means 10 as to reduce the output of the motor-generator. As a result, the loss of energy due to the conversion efficiency of the motor-generator 5 can be reduced to improve the mileage.

According to the control system, the shift is so executed on the basis of the preset shift map as to reduce the output of the motor-generator 5 so that the control can be simplified.

According to the control system, the output values of the motor-generator 5 at the individual gear stages are determined by the compute means, and the gear stage for minimizing the outputs is selected by the select means. As a result, the output of the motor-generator 5 can be reliably reduced.

According to the control system, for a high degree of change in the accelerator opening, a downshift (or a kick-down shift) is executed when the accelerator opening changes in the positive direction, so that an acceleration demanded by the driver may be output. When the accelerator opening changes in the negative direction, on the other hand, an up-shift (or an off-up-shift) is executed. This makes it possible to establish an acceleration matching the intention of the driver.

According to the control system, if the residue of the battery 7 is within a proper range (i.e., residue is 60 to 85%), it can be judged that an excellent balance is occurring between the output of the engine and the output of the motor-generator. That is, the fuel consumption of the engine is minimized so as to not consume the electric power of the battery excessively by the drive of the motor-generator. As a result, the mileage can be improved to effect such a shift that the residue of the battery is within the proper range.

Having described specific embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined in the appended claims.

What is claimed is:

1. A control system for a vehicular drive unit, comprising:

an engine having an output torque;

a motor-generator for acting as a motor and a generator;

a planetary gear including at least three rotary elements, the first rotary element connected to the output shaft of said engine, the second rotary element reacting against said first rotary element and connected to said motor-generator, and the third rotary element connected to an output member for transmitting a drive power to wheels;

a battery for storing electric power as generated by said motor-generator, and for feeding electric power to drive said motor-generator;

engine control means for causing said engine to output a target output value on a best mileage curve; and motor-generator control means for controlling said motor-generator, wherein said motor-generator control means causes said motor-generator, when an output value of said motor-generator corresponding to the target output value of said engine is within an outputtable region of said motor-generator, to output a reaction torque corresponding to the output torque of said engine, and said motor-generator control means changes the target output value of said engine, when a required output of said motor-generator is outside of the outputtable region of said motor-generator, so that said output of said motor-generator is within the outputtable region of said motor-generator, to thereby change the output of said motor-generator in accordance with the changed target output value of said engine, the outputtable region being between a maximum output at a motor drive time and a maximum output at a generation time.

2. A control system for a vehicular drive unit according to claim 1, wherein said motor-generator control means changes the target output value of said engine, when said output of said motor-generator is outside of the outputtable range of said motor-generator, so that said output of said motor-generator lies on a maximum outputtable curve of said motor-generator.

3. A control system for a vehicular drive unit according to claim 1, further comprising:

an automatic transmission connected to said output member for establishing a plurality of gear stages; and shift control means for shifting said automatic transmission to a gear stage at which the output of said motor-generator is smaller than an output of a prevailing gear stage.

4. A control system for a vehicular drive unit according to claim 3, further comprising:

an acceleration sensor for detecting an accelerator opening; and a vehicle speed sensor for detecting a vehicle speed, and wherein said shift control means has a shift map for setting the plurality of gear stages in accordance with the accelerator opening and the vehicle speed as outputted from said acceleration sensor and said vehicle speed sensor.

5. A control system for a vehicular drive unit according to claim 3, wherein said shift control means includes:

compute means for computing outputs of said motor-generator individually at the plurality of gear stages; and select means for selecting the gear stage at which the output of said motor-generator is a minimum from a result of computation of said compute means.

6. A control system for a vehicular drive unit according to claim 3, further comprising an acceleration sensor for detecting an accelerator opening, and wherein said shift control means includes demanded shift means for shifting according to a degree of change in the accelerator opening when the degree of change in the accelerator opening is over a predetermined value.

7. A control system for a vehicular drive unit according to claim 3, further comprising battery residue detecting means for detecting the residue of said battery, wherein said shift control means includes shift correcting means for shifting in response to an output signal from said battery residue detecting means so that the battery residue falls within a proper range.

* * * * *